United States Patent
Kim et al.

(10) Patent No.: US 7,629,833 B2
(45) Date of Patent: Dec. 8, 2009

(54) POWER SUPPLY APPARATUS OF SEMICONDUCTOR INTEGRATED CIRCUIT

(75) Inventors: Hyung-Soo Kim, Gyeonggi-do (KR);
Kun-Woo Park, Gyeonggi-do (KR);
Yong-Ju Kim, Gyeonggi-Do (KR);
Ic-Su Oh, Gyeonggi-do (KR);
Hee-Woong Song, Gyeonggi-do (KR);
Jong-Woon Kim, Gyeonggi-do (KR);
Tae-Jin Hwang, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 176 days.

(21) Appl. No.: 11/822,269

(22) Filed: Jul. 3, 2007

(65) Prior Publication Data
US 2008/0088360 A1 Apr. 17, 2008

(30) Foreign Application Priority Data
Oct. 12, 2006 (KR) .................. 10-2006-0099547

(51) Int. Cl.
*G05F 1/10* (2006.01)
*G05F 3/02* (2006.01)
(52) U.S. Cl. .................................................. 327/538
(58) Field of Classification Search ................ 327/530, 327/538, 540, 541, 543
See application file for complete search history.

(56) References Cited

U.S. PATENT DOCUMENTS

| 5,452,896 | A | 9/1995 | Core |
| 5,784,120 | A * | 7/1998 | Cummins et al. ............ 348/537 |
| 6,774,713 | B2 * | 8/2004 | Watanabe ..................... 327/540 |
| 7,368,902 | B2 * | 5/2008 | Clements et al. ......... 324/158.1 |
| 2005/0231269 | A1 | 10/2005 | Kim et al. |
| 2006/0022745 | A1 * | 2/2006 | Nakamura ................... 327/541 |
| 2006/0091938 | A1 | 5/2006 | Kim |
| 2007/0024363 | A1 * | 2/2007 | Cho ......................... 330/124 R |

FOREIGN PATENT DOCUMENTS

| KR | 10-0212348 | 5/1999 |
| KR | 1019990081305 | 11/1999 |

* cited by examiner

*Primary Examiner*—Quan Tra
(74) *Attorney, Agent, or Firm*—Venable LLP; Jeffri A. Kaminski

(57) ABSTRACT

A power supply apparatus of a semiconductor integrated circuit includes a power control device that detects a level of power supplied from the outside and outputs a control signal as information on the detected level, and a power supply device that controls an internal resistance component in response to an input of the control signal, controls the level of the power supplied from the outside, and supplies the power having the controlled level to circuit blocks.

9 Claims, 2 Drawing Sheets

POWER SUPPLY APPARATUS OF SEMICONDUCTOR INTEGRATED CIRCUIT

CROSS-REFERENCE TO RELATED PATENT APPLICATION

This application claims the benefit of Korean Patent Application No. 10-2006-0099547, filed on Oct. 12, 2006, in the Korean Intellectual Property Office, the disclosure of which is incorporated herein in its entirety by reference.

BACKGROUND OF THE INVENTION

1. Technical Field

The present invention relates to a semiconductor integrated circuit, and more particularly, to a power supply apparatus of a semiconductor integrated circuit.

2. Related Art

In general, a semiconductor integrated circuit is supplied with power, such as external supply power VDD and ground power VSS, generates voltages, such as a reference voltage Vref, a core voltage Vcore, a peripheral voltage Vperi, a pumped voltage VPP, and a bulk voltage VBB, and uses the generated voltages. The semiconductor integrated circuit includes a power supply apparatus that receives the external supply power and the ground power and supplies the received power to circuit blocks in the semiconductor integrated circuit.

Because of a high integration density and a high-speed operation of the semiconductor integrated circuit, a potential level of the external supply power is decreasing. Therefore, the external supply power and the ground power input to the power supply apparatus are increasingly affected by parasitic components, and thus stability is reduced. The parasitic components that exist in the power supply apparatus may be divided into resistive and capacitive parasitic components. In order to ignore the parasitic components, a plurality of resistors and a plurality of capacitors are installed in the power supply apparatus. Currently, the power supply apparatus has been designed such that the power supply apparatus ignores the resistive parasitic component or minimizes resistance values of the plurality of resistors.

When the resistors have the minimum resistance values, it is possible to expect an improvement in operating efficiency of the power supply apparatus.

However, when the semiconductor integrated circuit is exposed to various external environments after a mounting process, despite the reduction in the resistance values, it may be impossible to ensure the improvement in the operating efficiency of the power supply apparatus. This is because the parasitic component in the power supply apparatus varies according to various environments.

SUMMARY OF THE INVENTION

Embodiments of the present invention provide a power supply apparatus of a semiconductor integrated circuit that reduces an erroneous operation and improves operating efficiency.

An embodiment of the present invention provides a power supply apparatus of a semiconductor integrated circuit. The apparatus includes a power control device that detects a level of power supplied from the outside of the device and outputs a control signal as information on the detected level, and a power supply device that controls an internal resistance component in response to an input of the control signal, controls the level of the power supplied from the outside, and supplies the power having the controlled level to circuit blocks.

DESCRIPTION OF EXEMPLARY EMBODIMENT

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
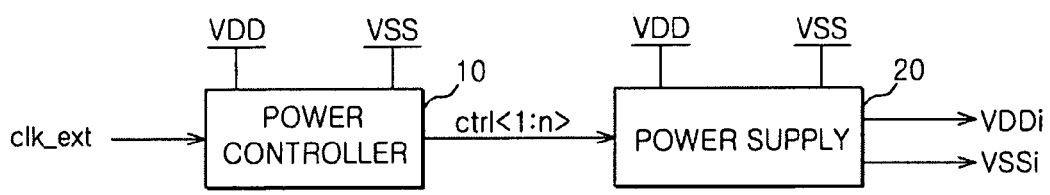
FIG. 1 is a block diagram illustrating the structure of a power supply apparatus of a semiconductor integrated circuit according to an embodiment of the present invention.

Referring to FIG. 1, the power supply apparatus includes a power controller 10 and a power supply 20.

The power controller 10 is supplied with an external clock clk_ext, external supply power VDD, and ground power VSS, detects a level of the external supply power VDD and a level of the ground power VSS to output an n-bit control signal ctrl<1:n> as level information of the external supply power VDD and the ground power VSS. The power controller 10 generates a sampling clock from the external clock clk_ext and performs a sampling operation of the external supply power VDD and the ground power VSS. This operation is a preceding operation, in which the levels of the external supply power VDD and the ground power VSS with respect to reference power are detected and the detection result is converted into a digital signal. Then, the digital signal, into which the level information on each of the external supply power VDD and the ground power VSS is converted, is converted into the n-bit control signal ctrl<1:n>.

The power supply 20 controls the level of each of the external supply power VDD and the ground power VSS in response to the input of the n-bit control signal ctrl<1:n>. This operation is performed in such a way that a resistance value of a resistor unit between a power line of the external supply power VDD and a power line of the ground power VSS, which are provided in the power supply 20, is controlled according to the n-bit control signal ctrl<1:n>. Therefore, a resistive parasitic component that is generated between the power line of the external supply power VDD and the power line of the ground power VSS is offset, such that the effect of the parasitic component can be minimized. Further, since the operation of controlling the resistance value can be performed not only during the design process but also during a process following the mounting process, it is possible to more efficiently cope with the generation of the parasitic component due to a change in external environment.

Figure 2:
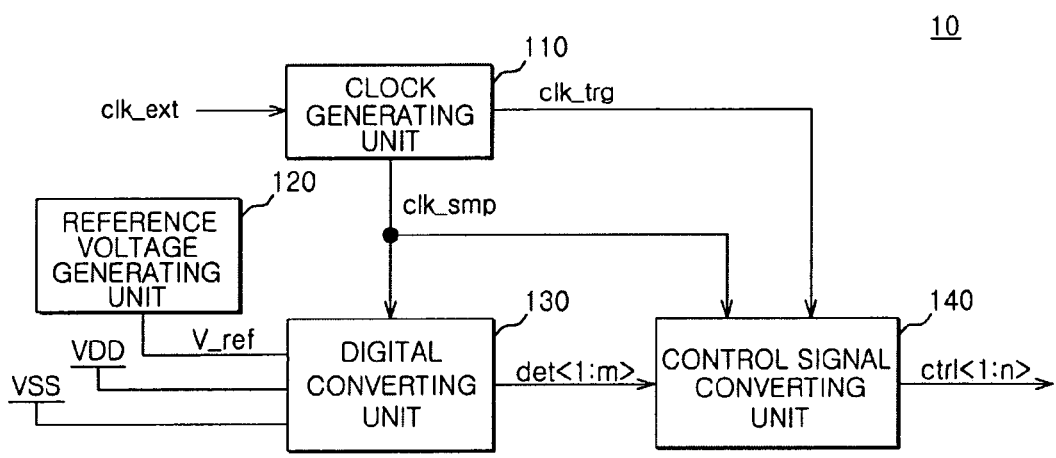
FIG. 2 is a diagram illustrating the structure of a power control device shown in FIG. 1.

As shown in FIG. 2, the power controller 10 includes a clock generating unit 110, a reference voltage generating unit 120, a digital converting unit 130, and a control signal generating unit 140.

The clock generating unit 110 is supplied with the external clock clk_ext to generate a sampling clock clk_smp and a trigger clock clk_trg. The generated sampling clock clk_smp has a higher frequency than the trigger clock clk_trg.

The reference power generating unit 120 generates reference power V_ref.

The digital converting unit 130 receives the sampling clock clk_smp generated by the clock generating unit 110, uses the reference voltage V_ref as a reference, detects a level change in each of the external supply power VDD and the ground power VSS, and converts the detection information into an m-bit detection signal det<1:m>.

The control signal generating unit 140 receives the sampling clock clk_smp and the trigger clock clk_trg to generate the n-bit control signal ctrl<1:n> from the m-bit detection signal det<1:m>.

Here, the digital converting unit 130 uses the sampling clock clk_smp to sample and divide the external supply power VDD and the ground power VSS into a predetermined period. The digital converting unit 130 samples the external supply power VDD and the ground power VSS by using the sampling clock clk_smp and generates the m-bit detection signal det<1:m>. At this time, the m-bit detection signal det<1:m> includes information on the level of the external supply power VDD and the level of the ground power VSS. Then, the control signal generating unit 140 converts the m-bit detection signal det<1:m> into the n-bit control signal ctrl<1:n>. As a result, the n-bit control signal ctrl<1:n> includes the information on the level of the external supply power VDD and the level of the ground power VSS.

Meanwhile, in response to the input of the n-bit control signal ctrl<1:n>, the power supply 20 controls the level of the external supply power VDD and the level of the ground power VSS and supplies internal power VDDi and internal ground power VSSi to circuit blocks.

Figure 3:
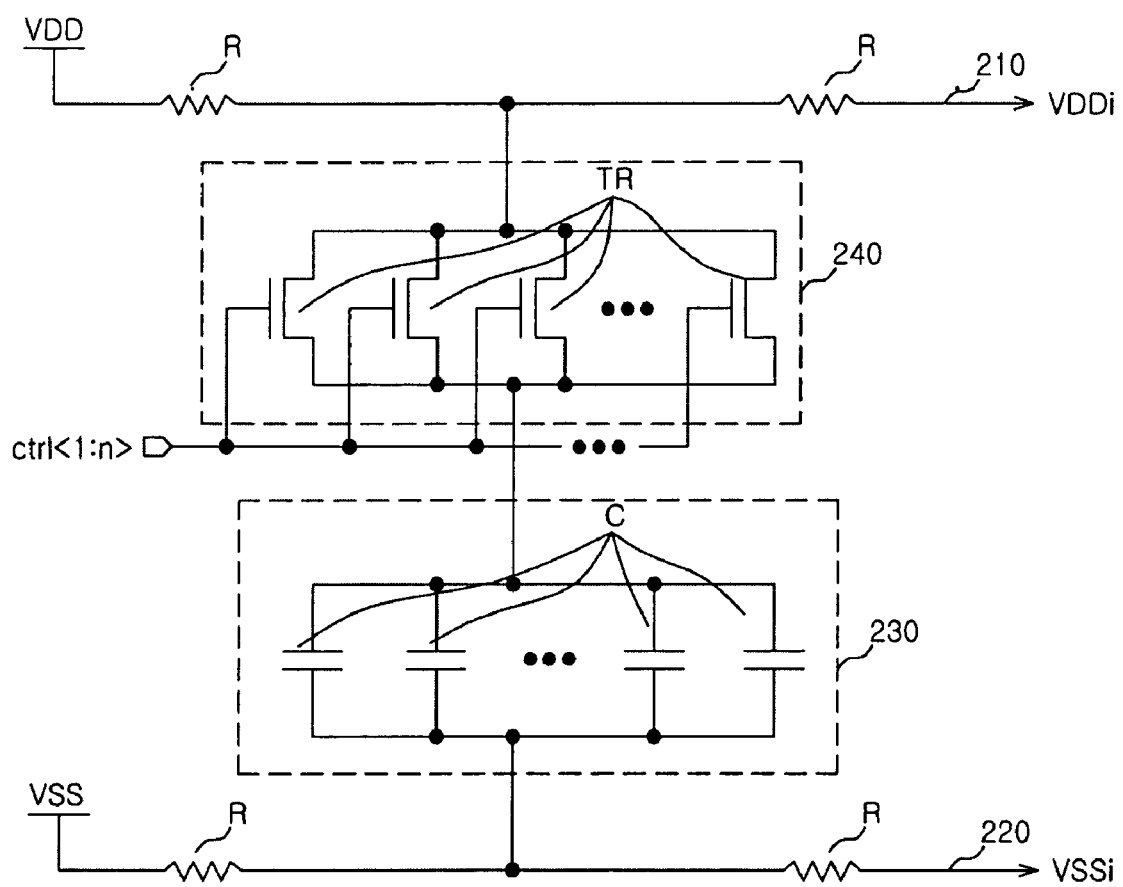
FIG. 3 is a diagram illustrating the structure of a power supply device shown in FIG. 1.

As shown in FIG. 3, the power supply 20 includes a power line 210 of the external supply power VDD, a power line 220 of the ground power VSS, a capacitor unit 230, and a variable resistor unit 240.

The capacitor unit 230 is located between the power line 210 of the external supply power VDD and the power line 220 of the ground power VSS, and controls a capacitive parasitic component from parasitic components that are generated between the power line 210 of the external supply power VDD and the power line 220 of the ground power VSS.

The variable resistor unit 240 is also located between the power line 210 of the external supply power VDD and the power line 220 of the ground power VS, and controls a resistive parasitic component from the parasitic components that are generated between the power line 210 of the external supply power VDD and the power line 220 of the ground power VSS. The variable resistor unit 240 may be connected in series to the capacitor unit 230.

Each of the power line 210 of the external supply power VDD and the power line 220 of the ground power VSS is provided with a plurality of resistors R that control the level of the external supply power VDD and the level of the ground power VSS.

The capacitor unit 230 includes a plurality of capacitors C that are connected in parallel with each other.

The variable resistor unit 240 may include n transistors TR that are connected in parallel with each other. Each bit of the n-bit control signal ctrl<1:n> is transmitted to a gate terminal of each of the transistors TR.

According to the above-structure, when a logic value of the n-bit control signal ctrl<1:n> changes, a resistance value of the variable resistor unit 240 changes by a selected operation of each of the transistors TR. The change in the resistance value of the variable resistor unit 240 offsets the resistive parasitic component from the parasitic components that are generated between the power line 210 of the external supply power VDD and the power line 220 of the ground power VSS to thereby minimize the resistive parasitic component.

That is, in the power supply circuit of the semiconductor integrated circuit according to an embodiment of the present invention, when the level of the external supply power VDD or the level of the ground power VSS changes due to the external environment, the logic value of the n-bit control signal ctrl<1:n> is changed. The resistance value of the variable resistor unit 240 of the power supply 20 is correspondingly changed, such that the resistive parasitic component of the parasitic components generated between the power lines can be reduced. In particular, in consideration of various environments to which the semiconductor integrated circuit is exposed after the mounting process, since the parasitic components are variably controlled as described above, the circuit blocks of the semiconductor integrated circuit can be stably supplied with power regardless of the external environment. The power supply apparatus of the semiconductor integrated circuit according to an embodiment of the present invention reduces an erroneous operation by adaptively controlling the parasitic components of the power that is externally supplied in various environments and improves the operating efficiency by stably supplying the power.

It will be apparent to those skilled in the art that various modifications and changes may be made without departing from the scope and spirit of the present invention. Therefore, it should be understood that the above embodiments are not limitative, but illustrative in all aspects. The scope of the present invention is defined by the appended claims rather than by the description preceding them, and therefore all changes and modifications that fall within metes and bounds of the claims, or equivalents of such metes and bounds are therefore intended to be embraced by the claims.

What is claimed is:

1. A power supply apparatus of a semiconductor integrated circuit, the apparatus comprising:
a power controller that detects a level of power supplied from outside to output a control signal as information on the level detected; and
a power supply that controls an internal resistance component in response to the control signal, controls the level of the power supplied from the outside using the control signal, and supplies the power supplied from the outside having the level controlled to circuit blocks, wherein the power controller includes:
a clock generating unit that receives an external clock and generates a sampling clock and a trigger clock;
a reference voltage generating unit that generates reference power;
a digital converting unit that receives the sampling clock and converts information on a level change of the power supplied from the outside with respect to the reference power into a detection signal having a plurality of bits; and
a control signal generating unit that receives the sampling clock and the trigger clock and generates the control signal having the plurality of bits from the detection signal having a plurality of bits.

2. The apparatus of claim 1,
wherein the power supplied from the outside is external supply power or ground power.

3. The apparatus of claim 2,
wherein the power supply includes:
a power line of the external supply power;
a power line of the ground power;

a capacitor unit between the power line of the external supply power and the power line of the ground power so as to control a capacitive parasitic component from parasitic components that are generated between the power lines; and a variable resistor unit connected in series with the capacitor unit between the power line of the external supply power and the power line of the ground power so as to control a resistive parasitic component from the parasitic components that are generated between the power lines in accordance with the control signal having the plurality of bits.

4. The apparatus of claim 3,
wherein the capacitor unit includes a plurality of capacitors connected in parallel with each other.

5. The apparatus of claim 3,
wherein the variable resistor unit includes a plurality of transistors connected in parallel with each other, and
each of the plurality of bits of the control signal is input to a gate terminal of each of the plurality of transistors.

6. A power supply apparatus of a semiconductor integrated circuit, the apparatus comprising:
a power controller that generates a sampling clock and samples external supply power and ground power to output a control signal having a plurality of bits; and
a power supply that controls an internal resistance component in response to the control signal having the plurality of bits, controls a level of the external supply power and a level of the ground power using the control signal, and supplies the external power supply having the level controlled to circuit blocks, wherein the power controller includes:
a clock generating unit that receives an external clock and generates the sampling clock and a trigger clock;
a reference voltage generating unit that generates reference power;
a digital converting unit that receives the sampling clock and converts information on a level change of the power supplied from the outside with respect to the reference power into a detection signal having a plurality of bits; and
a control signal generating unit that receives the sampling clock and the trigger clock to generate the control signal having the plurality of bits from the detection signal having the plurality of bits.

7. The apparatus of claim 6,
wherein the power supply includes:
a power line of the external supply power;
a power line of the ground power;
a capacitor unit between the power line of the external supply power and the power line of the ground power to control a capacitive parasitic component from parasitic components that are generated between the power lines; and
a variable resistor unit connected in series to the capacitor unit between the power line of the external supply power and the power line of the ground power so as to control a resistive parasitic component from the parasitic components that are generated between the power lines according to the control signal having the plurality of bits.

8. The apparatus of claim 7,
wherein the capacitor unit includes a plurality of capacitors connected in parallel with each other.

9. The apparatus of claim 7,
wherein the variable resistor unit includes a plurality of transistors connected in parallel with each other, and
each of the plurality of bits of the control signal is input to a gate terminal of each of the plurality of transistors.

* * * * *